United States Patent
Burdzy et al.

(10) Patent No.: US 8,066,288 B2
(45) Date of Patent: Nov. 29, 2011

(54) COMPONENTS COMPRISING POLYISOBUTYLENE COMPOSITIONS

(75) Inventors: Matthew P. Burdzy, South Windsor, CT (US); Shingo Tsuno, Chigasaki (JP)

(73) Assignee: Henkel Corporation, Rocky Hill, CT (US)

( * ) Notice: Subject to any disclaimer, the term of this patent is extended or adjusted under 35 U.S.C. 154(b) by 170 days.

(21) Appl. No.: 12/477,253

(22) Filed: Jun. 3, 2009

(65) Prior Publication Data

US 2009/0263669 A1 Oct. 22, 2009

Related U.S. Application Data

(63) Continuation-in-part of application No. 11/549,331, filed on Oct. 13, 2006.

(60) Provisional application No. 60/728,730, filed on Oct. 20, 2005.

(51) Int. Cl.
*F02F 11/00* (2006.01)
(52) U.S. Cl. .......................... 277/592; 277/591
(58) Field of Classification Search .................. None
See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,220,972 A | 11/1965 | Lamoreaux | |
| 3,516,946 A | 6/1970 | Modic | |
| 3,814,730 A | 6/1974 | Karstedt | |
| 5,264,299 A | 11/1993 | Krasij et al. | |
| 6,057,054 A | 5/2000 | Barton et al. | |
| 6,159,628 A | 12/2000 | Grasso et al. | |
| 6,165,634 A | 12/2000 | Krasij et al. | |
| 6,426,380 B1 * | 7/2002 | Bovensiepen et al. | 524/398 |
| 6,451,468 B1 * | 9/2002 | Adachi | 429/510 |
| 6,451,469 B1 | 9/2002 | Nakamura et al. | |
| 6,495,278 B1 | 12/2002 | Schmid | |
| 6,555,620 B1 | 4/2003 | Manabe | |
| 6,593,020 B1 | 7/2003 | Yoo et al. | |
| 6,649,097 B2 | 11/2003 | Sasaki et al. | |
| 6,656,580 B2 | 12/2003 | Woods | |
| 6,680,138 B1 | 1/2004 | Honma et al. | |
| 6,764,624 B2 | 7/2004 | Saito et al. | |

(Continued)

FOREIGN PATENT DOCUMENTS

EP 159477 A1 10/1985

(Continued)

OTHER PUBLICATIONS

Garzon, F.H. et al; *The impact of impurities on long term PEMFC performance*; presentation preprint for 216th ECS Meeting, Vienna Austria, (Oct. 2009). Included with Applicants' response filed Sep. 9, 2010.

(Continued)

*Primary Examiner* — Melvin Mayes
*Assistant Examiner* — Stefanie Cohen
(74) *Attorney, Agent, or Firm* — Steven C. Bauman; James E. Piotrowski

(57) ABSTRACT

This document provides components comprising a predetermined sealing surface and a curable composition thereon. The cured reaction product of the curable composition forms a seal having improved resistance to vapor permeation when exposed to hydrocarbon fluids and especially to hydrocarbon fluids comprising low molecular weight components, oxygenated compounds, polar compounds or blends containing polar and non-polar compounds such as alcohol and alcohol containing fuels.

20 Claims, 8 Drawing Sheets

U.S. PATENT DOCUMENTS

| | | |
|---|---|---|
| 6,773,758 B2 | 8/2004 | Yamanaka |
| 6,864,009 B2 | 3/2005 | Yoo et al. |
| 6,875,534 B2 | 4/2005 | Nakamura et al. |
| 6,884,537 B2 | 4/2005 | Smith |
| 6,942,941 B2 | 9/2005 | Blunk et al. |
| 7,008,584 B2 | 3/2006 | Inoue et al. |
| 2002/0045046 A1 | 4/2002 | Sasaki et al. |
| 2002/0122970 A1 | 9/2002 | Inoue et al. |
| 2003/0054225 A1 | 3/2003 | Kaji et al. |
| 2003/0116185 A1 | 6/2003 | Oswald |
| 2004/0161667 A1 | 8/2004 | Fukuzawa et al. |
| 2005/0263246 A1 | 12/2005 | Yandrasits et al. |
| 2006/0243947 A1* | 11/2006 | Tsumura et al. .......... 252/299.01 |

FOREIGN PATENT DOCUMENTS

| | | |
|---|---|---|
| EP | 1059308 A1 | 12/2000 |
| JP | 2001-240756 | 4/2001 |
| JP | 2001-510932 | 7/2001 |
| KR | 2002-0091781 | 12/2002 |
| KR | 2005-0118047 | 12/2005 |
| WO | WO99/04446 | 1/1999 |
| WO | WO02/17422 | 2/2002 |
| WO | WO 02/084099 | 10/2002 |
| WO | WO02/093672 | 11/2002 |
| WO | WO2004/047212 | 6/2004 |
| WO | WO2004/061338 | 7/2004 |
| WO | WO2004/079839 | 9/2004 |
| WO | WO2004/107476 | 12/2004 |
| WO | WO2005/074060 | 8/2005 |
| WO | WO2005/078839 | 8/2005 |
| WO | WO2007/084561 | 7/2007 |

OTHER PUBLICATIONS

Schulze, M. et al; *Degradation of Sealings for PEFC test cells . . .* ; Journal of Power Sources; 127, 222-229 (2004). Included with Applicants' response filed Sep. 9, 2010.

Cheng, X. et al; *A review of PEM hydrogen fuel cell contamination, . . .* ; Journal of Power Sources; 165, 2, 739-756, (Mar. 2007) states that over 150 articles on the subject of fuel cell contamination were reviewed. Included with Applicants' response filed Sep. 9, 2010.

Molter, Trent M.; The effects of impurities on fuel cell performance and durability; (May 2007). Effects of fuel and air impurities on PEM fuel cell performance; 2008 DOE Hydrogen Program Review; presented by Fernando Garzon, Los Alamos National Laboratory, (Jun. 2008). Included with Applicants' response filed Sep. 9, 2010.

Schulze, M. et al; *Degradation of Sealings for PEFC test cells . . .* ; Journal of Power Sources; 127, 222-229 (2004). Included with Applicants' response filed Sep. 9, 2010.

St-Pierre, Jean, et al.; *Successful Demonstration of Ballard PEMFCS. . . .* ; Journal of New Materials for Electrochemical Systems; 5, 263-271 (2002). Included with Applicants' response filed Sep. 9, 2010.

Kelly, M.J. et al; *Conductivity of polymer electrolyte membranes . . .* ; Solid State Ionics; 176, 25-28, 2111-2114 (Aug. 2005). Included with Applicants' response filed Sep. 9, 2010.

Cheng, X. et al; *A review of PEM hydrogen fuel cell contamination, . . .* ; Journal of Power Sources; 165, 2, 739-756, (Mar. 2007). Included with Applicants' response filed Sep. 9, 2010.

Molter, Trent M.; The effects of impurities on fuel cell performance and durability; (May 2007). Included with Applicants' response filed Sep. 9, 2010.

Wu, J. et al; A review of PEM fuel cell durability: . . . ; Journal of Power Sources; 184, 105-119, 107, (Jun. 2008). Included with Applicants' response filed Sep. 9, 2010.

Molter, Trent M.; The effects of impurities on fuel cell performance and durability; (May 2007). Included with Applicants' response filed Sep. 9, 2010.

Zhang, X. et al; *Contamination of membrane-electrode assemblies by ammonia . . .* ; presentation preprint for 216th ECS Meeting, Vienna Austria, (Oct. 2009). Included with Applicants' response filed Sep. 9, 2010.

Privette, R.M. et al; *2.5 MW PEM fuel cell system for Navy ship service power*, paper presented at the 1999 Review Conference on Fuel Cell Technology (1999). Included with Applicants' response filed Sep. 9, 2010.

Hoffman, Donald; *Marine Fuel Cells*; Marine Vessel and Air Quality Conference; Feb. (2001). Included with Applicants' response filed Sep. 9, 2010.

Cleghorn, S.J.C. et al; *A polymer electrolyte fuel cell life test . . .* ; Journal of Power Sources; 158, 446-454, 453 (2006). Included with Applicants' response filed Sep. 9, 2010.

\* cited by examiner

US 8,066,288 B2

COMPONENTS COMPRISING POLYISOBUTYLENE COMPOSITIONS

RELATED U.S. APPLICATIONS

This is a continuation-in-part of U.S. patent application Ser. No. 11/549,331, filed Oct. 13, 2006, which claims the benefit of U.S. Patent No. 60/728,730, filed on Oct. 20, 2005, the contents of each of which are incorporated by reference.

FIELD

The present disclosure provides components having a seal on a predetermined sealing surface formed from the reaction product of a curable composition.

BRIEF DESCRIPTION OF RELATED TECHNOLOGY

Flowable gasketing compositions are used extensively, for example, to seal surfaces fluidly connected to an internal chamber to prevent materials from moving between the surfaces and entering or leaving the chamber. After curing the gasketing compositions may become exposed to a variety of environmental conditions, temperatures, pressures and fluids, including exposure to fuels, engine oils, hydraulic fluids, transmission fluids, brake fluids, lubricants, coolants, refrigerants, greases and other compounds in a gaseous, liquid, semi-solid or solid state.

In the past, most gasketing compositions were only required to prevent leakage of materials in a liquid state between the sealed surfaces. However, it has become increasingly important to minimize the loss of gases and other volatile compounds from sealed chambers. For example, minimizing emission of vapors to the environment from all parts of a vehicle has become important due to environmental regulations such as the California Super Ultra Low Emission Vehicle (SULEV) standard. As a result permeability of gasketing compositions to gases and other volatile materials has become an additional important measure of performance for gasketing compositions. It is also important to provide gasketing compositions that have low permeability to alternative fuels such as reformulated gasoline, E10 ethanol, E85 ethanol, diesel, biodiesel, natural gas and liquefied petroleum gas (LPG). Gasketing compositions are also desirably resistant to multiple types of fuels such as gasoline and E85 ethanol used in flex-fuel vehicles.

Known liquid gasketing compositions, for example silicone compounds or some poly(acrylate) based gasketing compositions, frequently suffer from high permeability to various automotive fluids and volatile materials. Vehicles using such gasketing compositions allow higher than desirable volatile material loss under test conditions and have difficulty meeting stringent requirements for low, ultra low and/or super ultra low emission vehicles.

Accordingly, it would be desirable to provide a flowable gasketing composition that, when cured, has low permeability to gases and volatile materials. It would be desirable to provide a component having a seal on a predetermined sealing surface formed from a cured composition that provides the component with low permeability to gases and volatile materials. It would be desirable to provide a sealed component for use with alternative fuels and multiple types of fuels.

SUMMARY

The present disclosure relates generally to curable compositions advantageously used for form-in-place gaskets but also useful in cure-in-place, mold-in-place or molded gaskets, which when cured exhibit low permeability to gases, volatile materials, oxygenated chemicals, polar compounds, non-polar compounds or combinations of these compounds and particularly to vapors and liquids from fuels containing alcohol such as E10 ethanol and E85 ethanol. The curable composition contains one or more functional oligomers or polymers containing isobutylene, isoprene, ethylene, propylene, butadiene, styrene, acrylonitrile, chloroprene or other co-polymerizable monomers in the backbone.

In one advantageous embodiment the curable composition comprises the reaction product of an alkenyl-terminated polyisobutylene oligomer, an optional polyfunctional alkenyl monomer; a cross-linker capable of undergoing a hydrosilylation reaction; and a hydrosilylation catalyst. Desirably, the alkenyl terminated polyisobutylene oligomer is an alkenyl terminated diallyl polyisobutylene oligomer. Desirably, the cross-linker capable of undergoing a hydrosilylation reaction comprises at least two reactive silicon hydride groups per molecule. Desirably, the composition has a silicon-hydride to alkenyl molar ratio of at least about 0.5:1 or greater.

In another aspect there is provided a method of preparing a gasket from a curable composition and placing it in use which includes the steps of:
a. providing at least one sealing surface,
b. providing the curable composition,
c. dispensing the composition on to at least a portion of the at least one surface,
d. exposing the dispensed composition to conditions appropriate to effect cure thereof, and
e. exposing the cured composition to a chemical in a gaseous, liquid, semi-solid or solid state such as automotive fuels, lubricants, coolants, brake fluids, or other related automotive fluids; including fuels such as gasoline, methanol, E10 ethanol, E85 ethanol, ethanol, diesel, biodiesel, natural gas, liquefied petroleum gas (LPG), and/or other alternative fuels or combinations thereof.

In another aspect there is provided a component having a first predetermined sealing surface aligned with a second predetermined sealing surface. A cured reaction product of a curable composition is disposed between the sealing surfaces to prevent movement of materials such as liquids, gasses or fuels between the aligned sealing surfaces. The composition may be cured in contact with one, both or none of the sealing surfaces. Advantageously, the seal formed by the cured reaction product has resistance to vapor permeation when exposed to hydrocarbon fluids and especially to hydrocarbon fluids comprising low molecular weight components, oxygenated compounds, polar compounds or blends containing polar and non-polar compounds such as alternative fuels, including reformulated gasoline, E10 ethanol, E85 ethanol, diesel, biodiesel, natural gas and liquefied petroleum gas.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION

Figure 1:
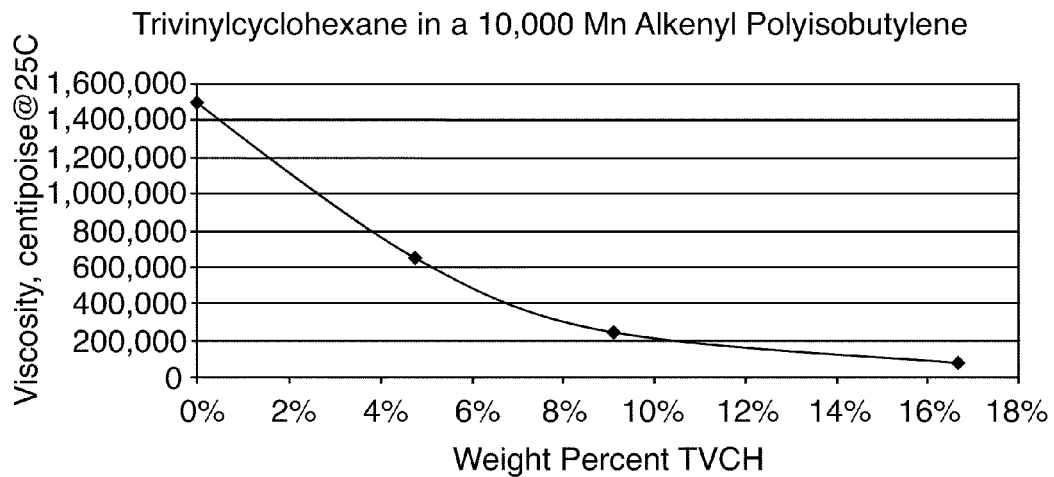
FIG. 1 is a graph of trivinylcyclohexane concentration versus viscosity for a 10,000 Mn alkenyl functional polyisobutylene composition.

In one aspect the present disclosure provides components sealed with a curable, gasketing composition which includes a functional polyisobutylene oligomer; an optional functional alkenyl monomer; a cross-linker having at least two silicon hydride functional groups; and a hydrosilylation catalyst.

Another aspect of the disclosure relates to components having a gasket therebetween formed from the cured reaction products of the curable gasketing composition. These cured reaction products have modified molecular structures, resulting in the gasket, and thereby the component, having enhanced resistance to volatile materials and alternative fuels.

The curable compositions useful in the components may be represented by the expression $(A\text{-}A+A_f+B_f)$, where "A-A" represents the alkenyl groups of the alkenyl terminated diallyl polyisobutylene oligomer, i.e., a difunctional alkenyl polyisobutylene ("PIB"), "A" represents an alkenyl group, "B" represents a Si—H group "f" refers to the number of corresponding functional groups.

The optional inclusion of certain additives in the compositions can modify the reactivity or prevent changes in chemical, physical, mechanical or other related performance properties of the composition such as permeability, volume, mass, hardness, modulus, elongation, strength, compression set, compressive stress relaxation which may occur upon exposure to hydrocarbon fluids, such as fuel oil or alcohol-containing products, and thus may desirably be included in the composition. The inclusion of an anti-oxidant package into the disclosed compositions may also improve the operating lifetime of reaction products of the compositions.

The functional polyisobutylene oligomer is advantageously an alkenyl-functional oligomer and more advantageously an alkenyl-terminated diallyl polyisobutylene oligomer. Useful functional poly(isobutylene) oligomers can be prepared from the living carbocationic polymerization of isobutylene. Monomers, initiators, co-initiators and reaction conditions can be modified to vary the molecular weight, backbone, functional groups and functionality of the oligomer. Oligomers have been prepared experimentally with number average molecular weights ranging from 5,000 to 20,000. The oligomers vary in viscosity from about 900,000 centipoise ("cps") to 2,700,000 cps at 25° C. Oligomers have been prepared that are clear water white to a light straw color. Other useful dialkenyl terminated linear polyisobutylene oligomers are described in U.S. Pat. No. 4,758,631 to Kennedy et al, the contents of which are herein incorporated by reference.

One useful functional alkenyl monomer having two alkenyl groups is 1,9-decadiene (CAS No. 1647-16-1), which has a molecular weight of 138.25 grams per mole. One useful optional functional alkenyl monomer having three or more alkenyl groups is trivinylcyclohexane (TVCH), which has the below chemical formula:

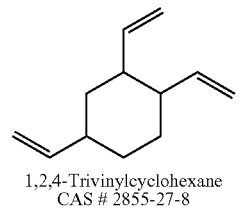

1,2,4-Trivinylcyclohexane
CAS # 2855-27-8

Trivinylcyclohexane is a low viscosity (1.3 mPas), trifunctional monomer. It has a molar mass of 162.3 grams per mole. The present disclosure, however, is not limited to the use of a tri-functional monomer, and monomers with two or more alkenyl groups may suitably be used with the curable compositions.

The functional alkenyl monomer or a combination of alkenyl monomers may be present in amounts from about 0.01 mole percent to 100 mole percent on a total alkenyl basis. Desirably, the functional alkenyl monomer or a combination of alkenyl monomers may be present in amounts from about 0.1 mole percent to about 50 mole percent on a total alkenyl basis. More desirably, the functional alkenyl monomer or a combination thereof may be present in amounts from less than 1 mole percent to up to 100 mole percent on a total functional alkenyl basis.

It is desirable to incorporate functional alkenyl monomers that are compatible with the polyisobutylene oligomer. Trivinylcyclohexane is a particularly desirable functional alkenyl monomer, as it is compatible with polyisobutylene resin. At up to about 20 weight percent trivinylcyclohexane, the resulting curable compositions form clear single-phase solutions.

When the overall functionality of the functional alkenyl monomer and cross-linker is less than or equal to two, polymerization yields a linear structure. An overall functionality greater than two can result in a cured composition having a cross-linked structure. By incorporating three or more alkenyl groups onto a single functional alkenyl monomer the cross-linking density of the cured composition increases, allowing modification of mechanical properties of the resulting composition.

The curable compositions also include a cross-linker capable of undergoing a hydrosilylation reaction and having at least two reactive silicon hydride groups per molecule, i.e., at least two Si—H groups per molecule. This component reacts with the alkenyl-functional diallyl polyisobutylene oligomer to form a cross-linked polymeric network. A hydrosilylation catalyst or Karstedt catalyst is used to drive the reaction to completion.

The silane cross-linker molecular structure is not limited and can be linear, branched, cyclic, comb, star, dendritic and/or modified. Combinations of silane cross-linkers having different molecular structures can be used. One advantageous silane cross-linker is shown in structure 1 wherein the structure has at least two silicon hydride functional groups:

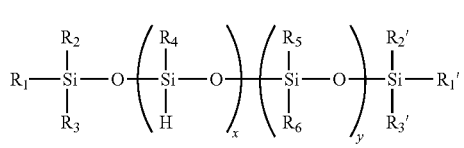

where $R_1$, $R_2$, $R_3$, $R'_1$, $R'_2$, $R'_3$, $R_4$, $R_5$ and $R_6$ are each independently selected from hydrogen; a methyl group; a phenyl group; a substituted hydrocarbon containing one to twenty carbon atoms; an unsubstituted hydrocarbon containing one to twenty carbon atoms. The hydride groups may each independently be terminal or pendent. X is an integer from 1 to 1,000; and y is an integer from 1 to 1000. Advantageously, at least two of $R_1$, $R_1'$, $R_2$, $R_2'$, $R_3$ and $R_3'$ are H. In one cross-linker $R_1$ or $R_1'$ is H and one of $R_2$, $R_2'$, $R_3$ and $R_3'$ is H. The silane cross-linking component should be present in amounts sufficient to achieve the desired amount of crosslinking and desirably in amounts greater than 0.5 moles of hydride per mole of alkenyl groups, more desirably in amounts greater than 0.9 moles of hydride per mole of alkenyl groups.

Useful hydrosilylation catalysts for this reaction include platinum or platinum-containing complexes such as the platinum hydrocarbon complexes described in U.S. Pat. Nos. 3,159,601 and 3,159,662; the platinum alcoholate catalysts described in U.S. Pat. No. 3,220,972, the platinum complexes described in U.S. Pat. No. 3,814,730 and the platinum chloride-olefin complexes described in U.S. Pat. No. 3,516,946; the contents of each of which are herein incorporated by reference. Each of these patents relating to platinum or platinum-containing catalysts are hereby expressly incorporated herein by reference. Desirably, the platinum or platinum-containing complex is dicarbonyl platinum cyclovinyl complex, platinum cyclovinyl complex, platinum divinyl complex, or combinations thereof. Useful catalysts are available from Sigma-Aldrich of St. Louis Mo.

The curable composition can optionally include an anti-oxidant. The anti-oxidant can be a radical quencher, peroxide inhibitor or the like.

The curable composition may also contain one or more adhesion promoters that are compatible and known in the art. Examples of useful commercially available adhesion promoters include octyl trimethoxysilane (commercially available from Chemtura under the trade designation A-137), glycidyl trimethoxysilane (commercially available from Chemtura under the trade designation A-187), methacryloxypropyl trimethoxysilane (commercially available from Chemtura under the trade designation of A-174), vinyl trimethoxysilane, tetraethoxysilane and its partial condensation products, and combinations thereof.

The curable compositions may also contain other additives so long as they do not inhibit the desirable properties such as curing mechanism, elongation, chemical resistance, low permeability. For example, conventional additives such as diluents, fillers, pigments, moisture scavengers, inhibitors, reaction modifiers and the like may be included. The curable compositions vary in viscosity from about 100 cps to about 2,800,000 cps, or about 500 cps to about 800,000 cps at 25° C.

The present disclosure also relates to a method of preparing a curable composition, the method including the steps of:
a. providing an alkenyl-terminated polyisobutylene oligomer; an optional functional alkenyl monomer; a silyl hardener having at least about two silicon hydride functional groups; and a hydrosilylation catalyst;
b. optionally providing additives to modify reactivity and maximize operating lifetime; and
c. mixing the alkenyl-terminated polyisobutylene oligomer; the functional alkenyl monomer; the silyl hardener having at least about two silicon hydride functional groups; and the hydrosilylation catalyst with the optional additives for a time sufficient and under appropriate conditions to form the composition.

Components to be sealed by the disclosed curable compositions have a first predetermined sealing surface that is aligned with a second predetermined sealing surface. Typically, the aligned sealing surfaces are in a fixed relationship and move very little relative to each other. The aligned sealing surfaces are generally in fluid communication with a chamber. The seal formed between the aligned sealing surfaces prevents movement of materials between the surfaces and into, or out of, the chamber.

One or both of the sealing surfaces can be machined or formed. The predetermined sealing surfaces are designed to allow a curable composition to be disposed on one or both surfaces during initial assembly of the component to form a seal therebetween. Design of the predetermined sealing surfaces enhances parameters such as alignment of the surfaces, contact area of the surfaces, surface finish of the surfaces, "fit" of the surfaces and separation of the surfaces to achieve a predetermined sealing effect. A predetermined sealing surface does not encompass surfaces that were not identified or designed prior to initial assembly to accommodate a seal or gasket, for example the outside surface of a component over which a repair material is molded or applied to lessen leaking. Sealing surfaces on an engine block and oil pan or engine intake manifold are examples of sealing surfaces in fixed relationship.

Figure 10:
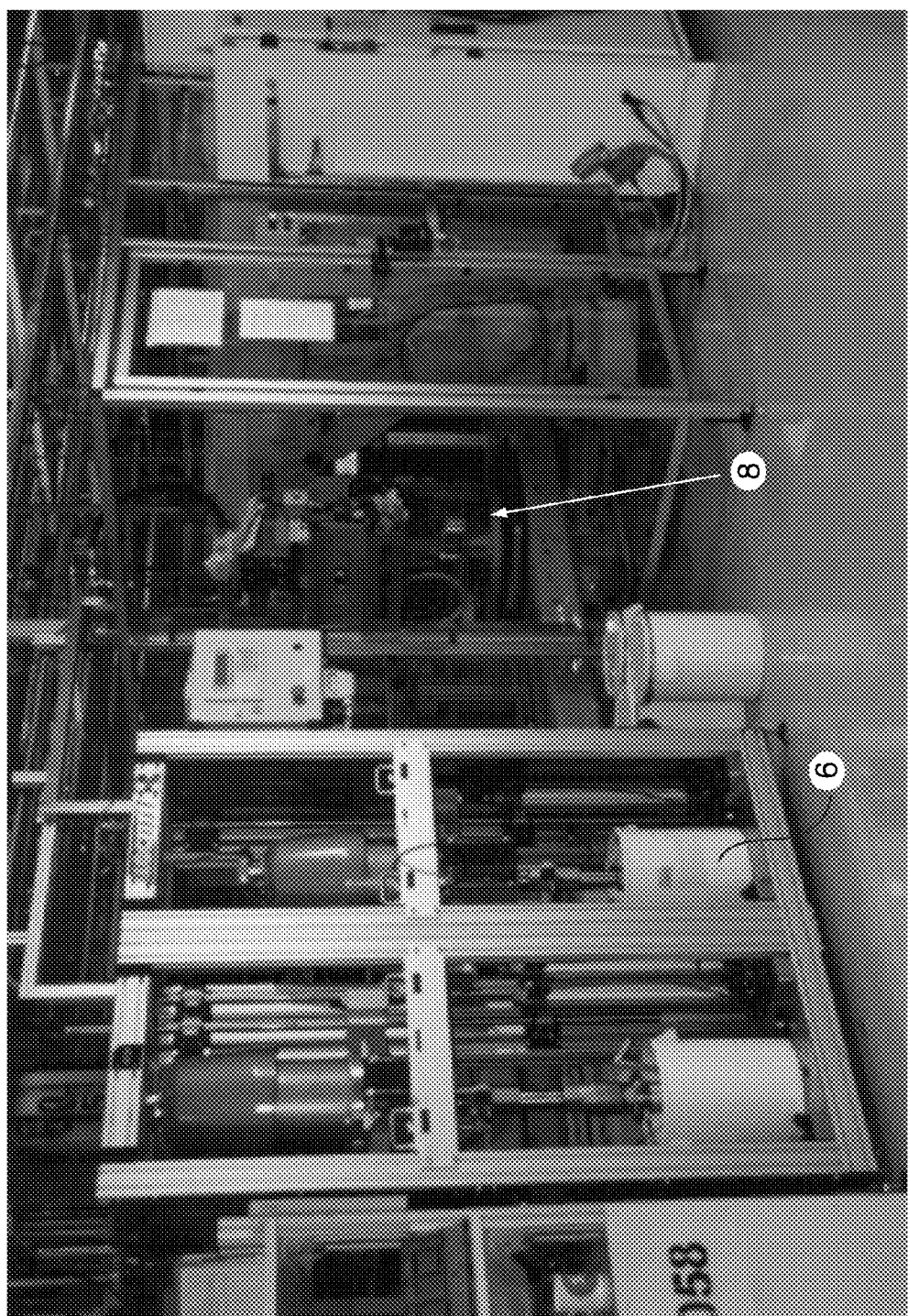
FIG. 10 depicts an automated curable composition application system.

The disclosed curable compositions can be in a flowable state for disposition onto at least a portion of one sealing surface to form a seal between the surfaces when they are aligned. The curable composition can be applied as a film over the sealing surface. The curable composition can also be applied as a bead in precise patterns by tracing, screen printing, robotic application and the like. In bead applications the disclosed compositions are typically dispensed as a liquid or semi-solid under pressure through a nozzle and onto the component sealing surface. The nozzle size is chosen to provide a line or bead of composition having a desired width, height, shape and volume. The curable composition can be contained in a small tube and dispensed by squeezing the tube; contained in a cartridge and dispensed by longitudinal movement of a cartridge sealing member; or, as shown in FIG. 10, contained in a larger container 6 such as a 5 gallon pail or 55 gallon drum and dispensed at the point of use by conventional equipment 8. Container size can be chosen to suit the end use application.

The disclosed curable compositions can be elastomeric. The disclosed curable compositions retain more of their original physical properties after exposure to fuels and especially fuels having a high content of low molecular weight components such as alcohols, for example E85 ethanol fuel, than conventional sealant materials such as silicone. The disclosed curable compositions are also more resistant to permeation by low molecular weight vapors than conventional sealant materials such as silicone. Thus the disclosed curable compositions are especially advantageous for use in applications involving sealing fuel system components to prevent fuel leakage. Such applications include, for example, sealing fuel injection components; sealing fuel manifolds; sealing carburetor components; sealing a carburetor to an intake manifold; sealing intake manifold components to each other; sealing an intake manifold to an engine block; sealing fuel filter components; sealing fuel tank components; etc.

The disclosed curable compositions have good resistance to many hydrocarbon lubricants. Thus the disclosed curable compositions are advantageous for use in some applications involving sealing vehicle powertrain components to prevent hydrocarbon lubricant leakage. Such applications include, for example, sealing an engine oil pan to an engine block; sealing an engine front cover to an engine block, sealing an engine timing chain cover to an engine block; sealing an engine rear cover to an engine block; sealing a valve cover to a head; sealing transmission components such as a transmission housing, a transmission cover or a transmission pan; sealing differential components such as a differential cover; sealing transfer case components such as a transfer case housing or a transfer case cover; etc.

It is believed that the disclosed curable compositions can be useful to seal aqueous based fluids. Thus, the disclosed curable compositions can be advantageous for use in applications involving, for example, sealing of vehicle water pumps; thermostat housings; radiators; etc.

The disclosed curable compositions would also be advantageous for uses in different applications such as off road vehicles, marine vehicles, aviation vehicles, construction equipment, heavy equipment and industrial equipment.

The curable composition can be used as a formed in place gasket (FIPG). In this application the composition is dispensed onto a first predetermined sealing surface. The first predetermined sealing surface and dispensed composition is aligned and sealingly engaged with a second predetermined sealing surface before the composition has fully cured. The composition will adhere to both sealing surfaces as it cures.

The curable composition can be used as a cured in place gasket (CIPG). In this application the composition is dispensed onto a first predetermined sealing surface and allowed to substantially cure before contact with a second predetermined sealing surface. The first sealing surface and cured composition is sealingly engaged with the second sealing surface thereby compressing the cured composition to provide a seal between the sealing surfaces. The composition will adhere to only the first sealing surface.

The curable composition can be used as a mold in place gasket (MIPG). In this application the part comprising the first predetermined sealing surface is placed in a mold. The composition is dispensed into the mold where it contacts the first sealing surface. The composition is typically allowed to cure before removal from the mold. After molding, the first sealing surface and molded composition is sealingly engaged with a second predetermined sealing surface thereby compressing the cured composition to provide a seal between the sealing surfaces. The composition will adhere to only the first sealing surface.

The curable composition may be useful to form a molded seal, for example, O-rings, hoses, seals and flat gaskets. These articles may be used in various industries where there is a need for chemically resistant articles. In this application the composition is disposed in a mold without any predetermined sealing surface. The composition is typically allowed to cure before removal from the mold. After removal the molded part will retain its shape. In sealing applications the molded gasket is disposed between two predetermined sealing surfaces and compressed to provide a seal between the sealing surfaces.

Figure 11:
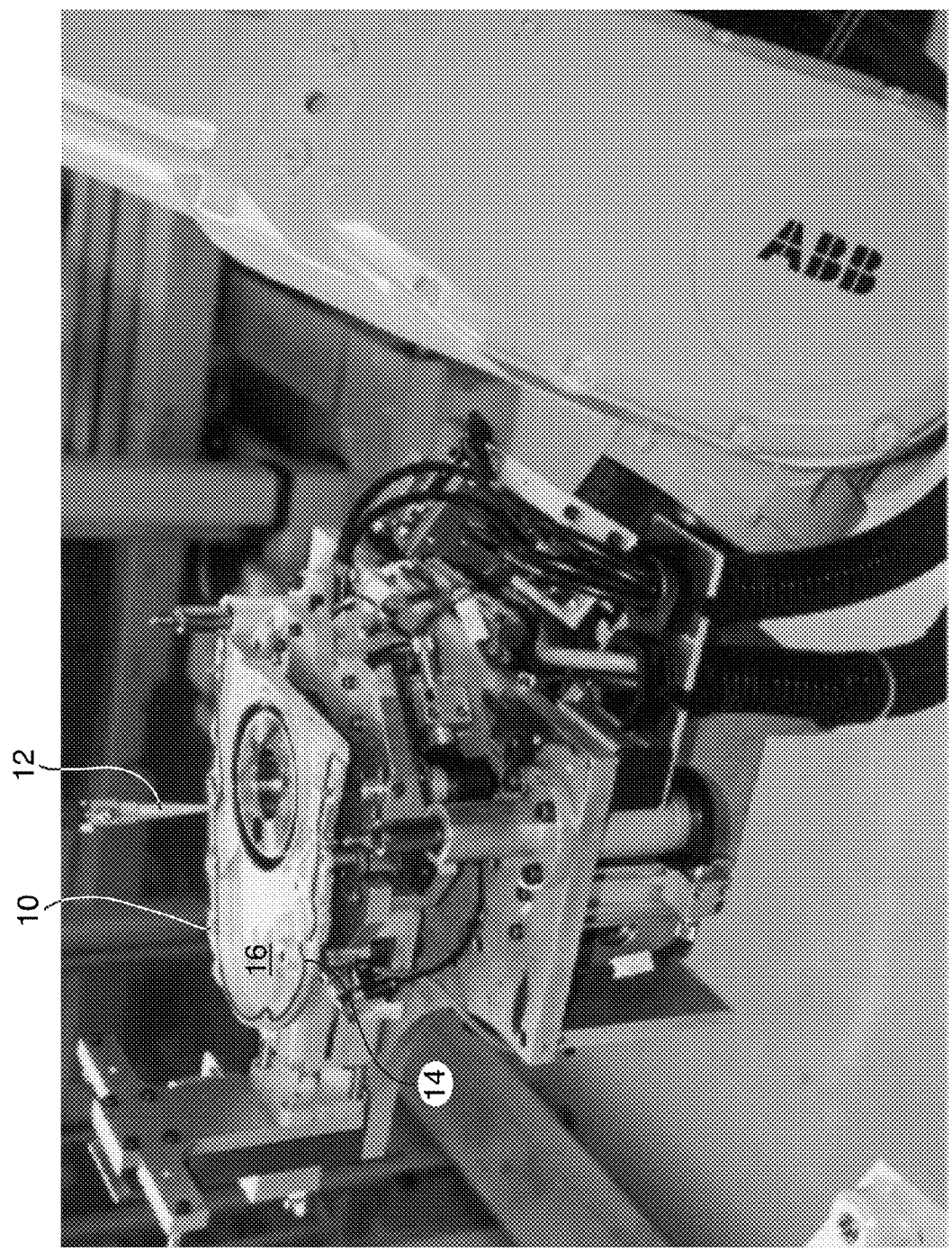
FIG. 11 depicts automated application of a bead of curable composition to an internal combustion engine component.

FIG. 11 illustrates robotic tracing of a semi-solid bead 10 of curable composition from a robotically controlled nozzle 12 onto a portion of the predetermined sealing surface 14 of an internal combustion engine cover 16. The cover 16 and bead 10 of composition is subsequently aligned with, and fixed to, an internal combustion engine block. The composition cures and bonds to the sealing surfaces to form a gasket or seal therebetween.

Figure 12:
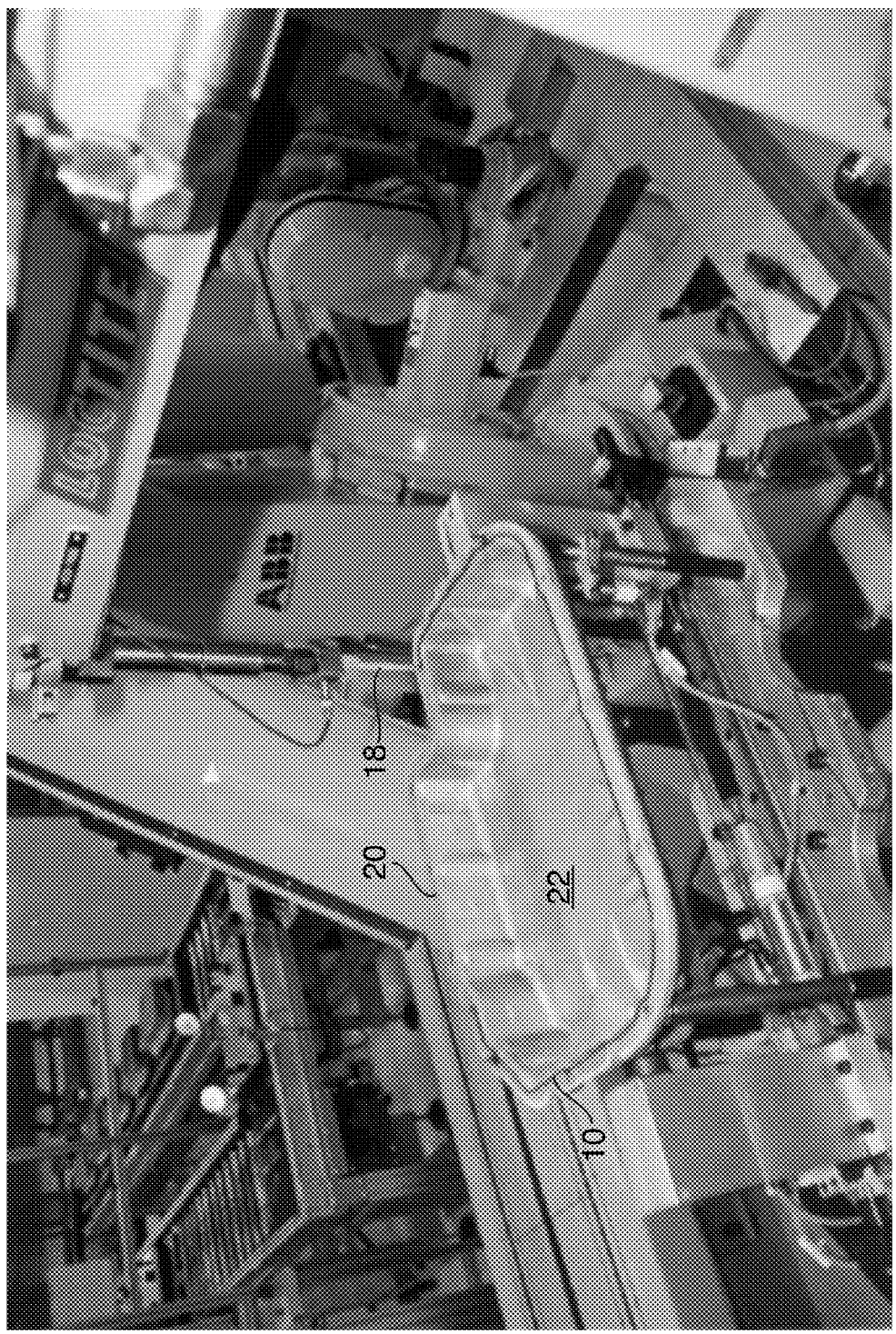
FIG. 12 depicts automated application of a bead of curable composition to an internal combustion engine oil pan.
Figure 13:
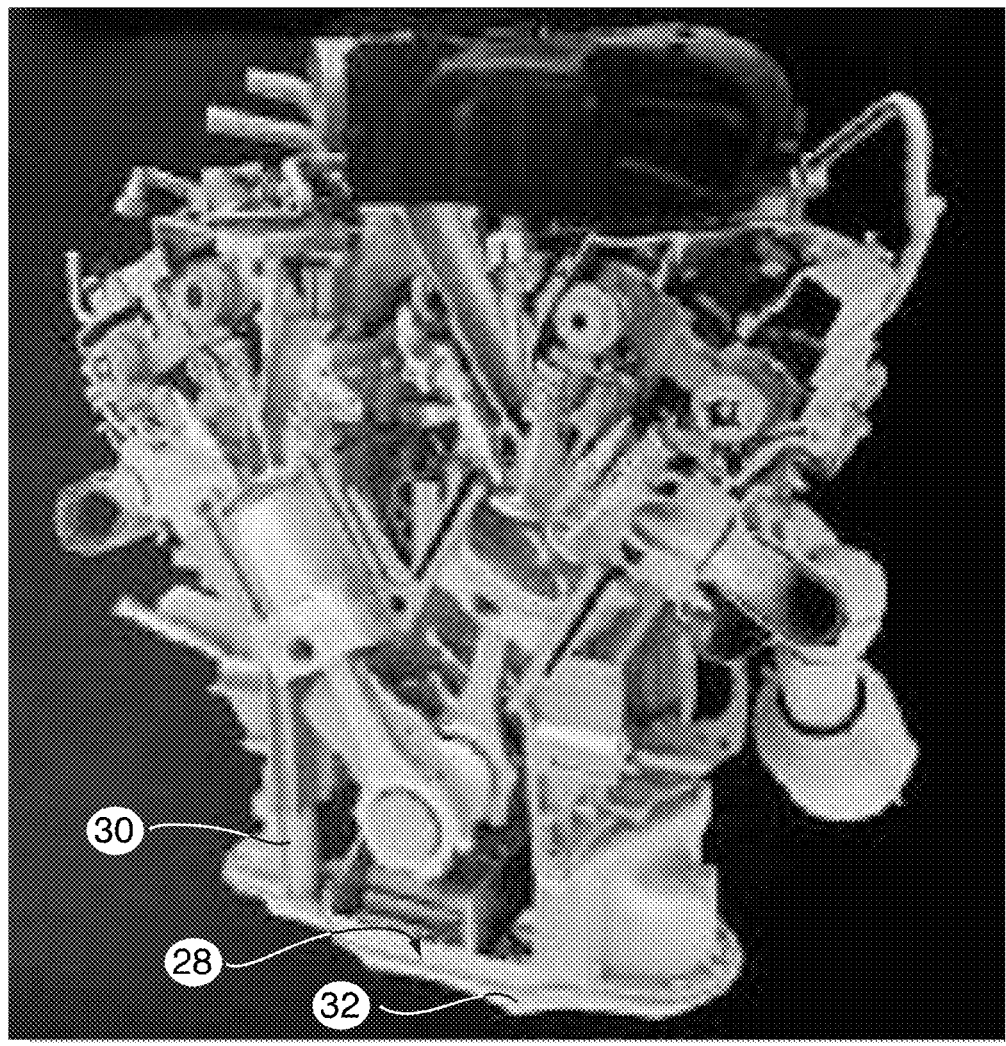
FIG. 13 is a schematic, broken away illustration showing the cured composition sealing an oil pan to the engine block.

FIG. 12 illustrates robotic tracing of a semi-solid bead 10 of curable composition from a robotically moved nozzle 18 around the entire periphery of the predetermined sealing surface 20 of an internal combustion engine oil pan 22. The oil pan 22 is subsequently aligned with, and fixed to, an internal combustion engine block. FIG. 13 illustrates a different seal 28 formed between an internal combustion engine block 30 and an oil pan 32.

The following Examples are included for purposes of illustration so that the disclosure may be more readily understood and are in no way intended to limit the scope of the disclosure unless otherwise specifically indicated.

Samples were cured by heating at a predetermined temperature (cure temp) for a predetermined time (cure time). Unless otherwise specified the following test procedures were used in the Examples.

| | |
|---|---|
| Shore A hardness | ASTM D2240-05 |
| Tensile strength | ASTM D412-98A |
| modulus | ASTM D412-98A |
| elongation | ASTM D412-98A |
| compression set | ASTM D395. Samples were allowed to cool to room temperature before removing. |
| pot life | Visual determination of when a probe stops pulling a string of sample from the bulk sample. |
| exotherm onset | Differential Scanning Calorimetry (DSC) ASTM D6674 |
| exotherm peak | Differential Scanning Calorimetry (DSC) ASTM D6674 |
| heat of reaction | Differential Scanning Calorimetry (DSC) ASTM D6674 |

EXAMPLE 1

Viscosity Modification of Alkenyl Functional Polyisobutylene Composition

Figure 2:
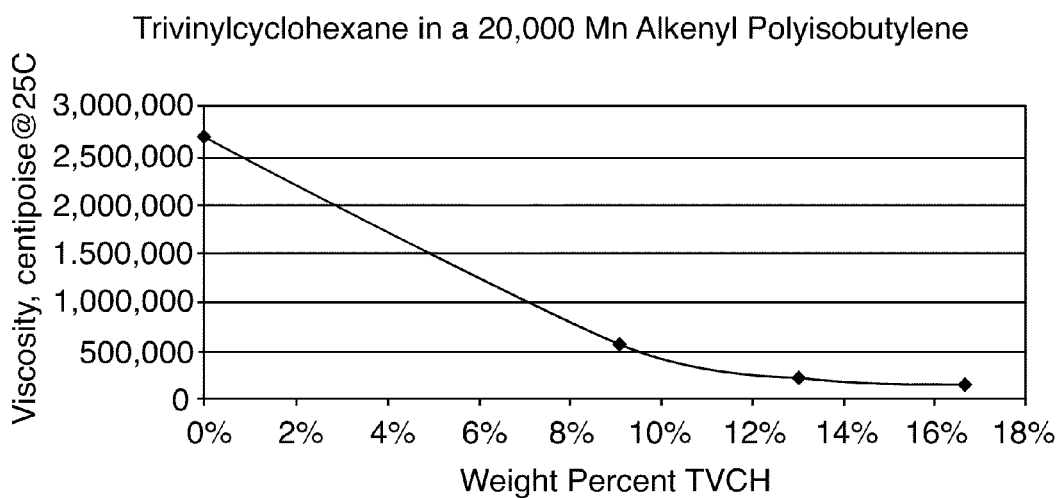
FIG. 2 is a graph of trivinylcyclohexane concentration versus viscosity for a 20,000 Mn alkenyl functional polyisobutylene composition.
Figure 3:
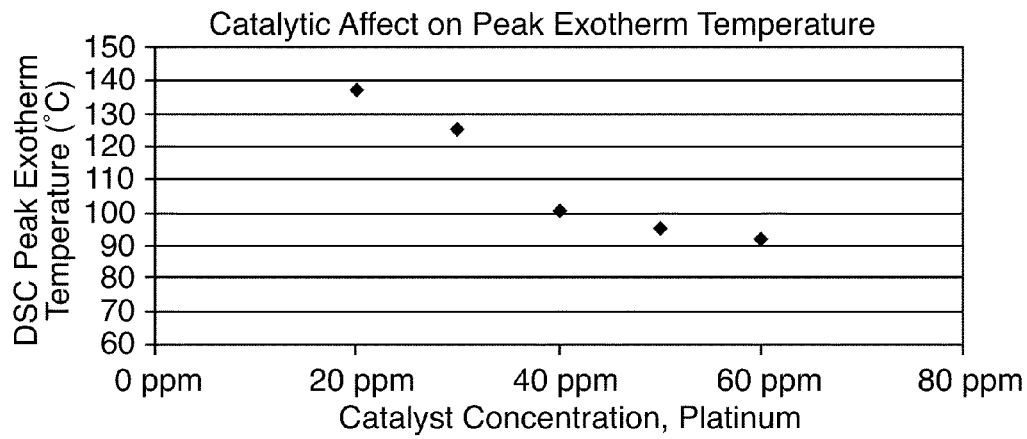
FIG. 3 is a graph of catalyst concentration versus peak exotherm temperature for an alkenyl functional polyisobutylene composition.

Trivinylcyclohexane was added to 5,000; 10,000 and 20,000 number average molecular weight (Mn) alkenyl functional polyisobutylene. Details are shown in FIG. 1, FIG. 2, Table 1 and Table 2 for a 10,000 and 20,000 molecular weight alkenyl functional polyisobutylene for curable compositions 1 through 6 and for comparative compositions A and B.

TABLE 1

| Description | Compar. Comp. A | Inv. Comp. 1 | Inv. Comp. 2 | Inv. Comp. 3 |
|---|---|---|---|---|
| Alkenyl Terminated Polyisobutylene (10,000 Mn), weight parts | 50 | 50 | 50 | 50 |
| Trivinylcyclohexane, weight parts | 0 | 2.5 | 5 | 10 |
| Viscosity (Haake, 150 RheoStress), centipoise | 1,500,000 | 650,500 | 234,000 | 67,500 |
| Shear Rate [1/s] | 12 | 12 | 12 | 12 |
| Temperature, ° C. | 25 | 25 | 25 | 25 |

TABLE 2

| Description | Compar. Comp. B | Inv. Comp. 4 | Inv. Comp. 5 | Inv. Comp. 6 |
|---|---|---|---|---|
| Alkenyl Terminated Polyisobutylene (20,000 Mn), weight parts | 50 | 50 | 50 | 50 |

TABLE 2-continued

| Description | Compar. Comp. B | Inv. Comp. 4 | Inv. Comp. 5 | Inv. Comp. 6 |
|---|---|---|---|---|
| Trivinylcyclohexane, weight parts | 0 | 5 | 7.5 | 10 |
| Viscosity (Haake, 150 RheoStress), centipoise | 2,711,000 | 561,000 | 212,750 | 127,500 |
| Shear Rate [1/s] | 12 | 12 | 12 | 12 |
| Temperature, ° C. | 25 | 25 | 25 | 25 |

Trivinylcyclohexane can be effective in reducing the viscosity of the alkenyl functional polyisobutylene resins. Curable compositions 1 through 6 did not separate and trivinylcyclohexane concentrations of up to about 20 weight percent with the alkenyl functional polyisobutylene resins formed clear single-phase compositions.

EXAMPLE 2

Thermal Properties and Stability Results of Curable, Alkenyl Functional Polyisobutylene Compositions Formulations were prepared with trivinylcyclohexane (compositions 7 through 11) and without trivinylcyclohexane (composition C) while keeping the molar ratio of Si—H to alkenyl groups and platinum to alkenyl groups constant. Differential Scanning Calorimetry (DSC) was used to obtain thermal data from the prepared compositions. Table 3 summarizes the formulations and data.

TABLE 3

| Description | Compar. Comp. C | Inv. Comp. 7 | Inv Comp. 8 | Inv. Comp. 9 | Inv. Comp. 10 | Inv. Comp. 11 |
|---|---|---|---|---|---|---|
| Alkenyl Terminated Polyisobutylene (5,000 Mn), weight parts | 100 | 100 | 100 | 100 | 100 | 100 |
| Polyalkyl Hydrogen Siloxane (1,200 Mn), weight parts | 10.0 | 33.2 | 33.2 | 33.2 | 33.2 | 33.2 |
| Trivinylcyclohexane, weight parts | 0 | 5 | 5 | 5 | 5 | 5 |
| Platinum Catalyst[1], weight parts | 0.0073 | 0.0223 | 0.0334 | 0.0425 | 0.0557 | 0.0668 |
| Parts per million of Platinum per Alkenyl Group (mppm) | 20 | 20 | 30 | 40 | 50 | 60 |
| Molar Ratio of Si—H to Alkenyl | 1.5:1 | 1.5:1 | 1.5:1 | 1.5:1 | 1.5:1 | 1.5:1 |
| Exotherm Start (° C.) | 68 | 107 | 94 | 72 | 66 | 70 |
| Exotherm Peak (° C.) | 97 | 137 | 125 | 100 | 95 | 92 |
| Exotherm End (° C.) | 130 | 187 | 180 | 152 | 145 | 140 |
| Heat of Reaction (Joules per gram) | 29.1 | 83.1 | 81.7 | 79.9 | 80.4 | 83.0 |

[1]0.1M Platinum (0)-1,3-Divinyl-1,1,3,3-tetramethyldisiloxane complex in xylene Comparative composition C had a heat of reaction of 29 joules per gram. Curable compositions 7 through 11, which have different amounts of platinum catalyst, contained five weight percent of trivinylcyclohexane based on 100 grams of alkenyl polyisobutylene. The heat of reaction increased up to about 83 joules per gram for the compositions containing trivinylcyclohexane.

The addition of trivinylcyclohexane increased the peak exotherm of the reaction from 97° C. (comparative composition C) to 137° C. (curable composition 7). This was unexpected since vinyl groups are typically more reactive than allyl groups.

In curable compositions it is desirable to keep the curing temperature below 130° C. and preferably below 110° C. for low temperature molding operations. Curable compositions 7 through 11 show that the peak exotherm temperature could be reduced from 137° C. to approximately 92° C. by increasing the amount of platinum from 20 parts per million of platinum per alkenyl group (mppm) to 60 mppm. This large drop in the peak exotherm temperature indicated that the activation temperature was significantly reduced. Thus, use of trivinylcyclohexane and an increased amount of platinum catalyst in an alkenyl functional polyisobutylene composition can increase the heat of reaction; reduce the peak exotherm temperature; and maintain a useful viscosity for screen-printing, liquid dispensing, liquid molding operations and other types of application methods. An alkenyl functional polyisobutylene composition without one or both of the trivinylcyclohexane and an increased amount of platinum catalyst does not appear to show these advantages. The rate of change in the peak exotherm decreased dramatically above 60 mppm within this set of experiments. Thus, there is a practical limit to the benefit that can be derived from increasing the concentration of catalyst. The addition of trivinylcyclohexane provided some very desirable and unexpected results.

Affect of Catalyst Concentration on Curable, Alkenyl Functional Polyisobutylene Compositions without Inhibitors Alkenyl functional polyisobutylene compositions were prepared without trivinylcyclohexane (compositions D through G). The pot life for each of these compositions was tested. Pot life is the time it takes for the viscosity of the composition to triple. Table 4 summarizes these compositions and data.

As shown in Table 4 in the absence of trivinylcyclohexane and with catalyst concentrations as low as 15 mppm the composition would gel within minutes during the mixing operation.

It is possible to somewhat increase gel time by reducing the amount of catalyst within the composition. However, it is difficult to manufacture a useful, single part composition comprising an alkenyl terminated polyisobutylene material and higher catalyst levels without trivinylcyclohexane due the rapid material gelling.

TABLE 4

| Description | Compar. Comp. D | Compar. Comp. E | Compar. Comp. F | Compar. Comp. G |
|---|---|---|---|---|
| Alkenyl Terminated Polyisobutylene (5,000 Mn), grams | 100 | 100 | 100 | 100 |
| Polyalkyl Hydrogen Siloxane (1,200 Mn), grams | 6.8 | 6.8 | 6.8 | 6.8 |
| Trivinylcyclohexane, grams | 0 | 0 | 0 | 0 |

TABLE 4-continued

| Description | Compar. Comp. D | Compar. Comp. E | Compar. Comp. F | Compar. Comp. G |
|---|---|---|---|---|
| Platinum Catalyst[1], microliters | 8.0 | 6.0 | 4.0 | 2.0 |
| Parts per million of Platinum per Alkenyl Group (mppm) | 20 | 15 | 10 | 5 |
| Notes: | Gelled Fast | Gelled Fast | | |
| Pot Life (Minutes) | 8 | 8 | 15 | 60 |

[1]0.1M Platinum (0)-1,3-Divinyl-1,1,3,3-tetramethyldisiloxane complex in xylene Affect of Trivinylcyclohexane on Stability of Curable, Alkenyl Functional Polyisobutylene Compositions.

Alkenyl functional polyisobutylene compositions were prepared with trivinylcyclohexane (curable compositions 12 through 16) and without trivinylcyclohexane (comparative composition H). The pot life for each of these compositions was tested. Table 5 summarizes these compositions and data.

Addition of trivinylcyclohexane to alkenyl terminated polyisobutylene compositions unexpectedly improves gel time and shelf life of the composition, even at higher catalyst levels. Curable compositions 12 through 16 comprising trivinylcyclohexane experienced a slower increase in viscosity as a function of time when compared to comparative composition H that did not contain trivinylcyclohexane. For example, comparative composition H (without trivinylcyclohexane) gelled during the mixing process within minutes at room temperature. Comparative composition H would not be suitable for many gasketing applications due to the very short gel time. Alkenyl terminated polyisobutylene compositions (curable compositions 12 through 16) comprising trivinylcyclohexane at the same catalyst loading and higher remained liquid for a longer period of time, providing a practical amount of time for use in gasketing applications. The curable compositions desirably have longer time before gelling allowing those materials to be stored for longer periods and to be applied to a substrate as compared to the same alkenyl terminated polyisobutylene compositions without trivinylcyclohexane.

TABLE 5

| Description | Compar. Comp. H | Inv. Comp. 12 | Inv. Comp. 13 | Inv. Comp. 14 | Inv. Comp. 15 | Inv. Comp. 16 |
|---|---|---|---|---|---|---|
| Alkenyl Terminated Polyisobutylene (5,000 Mn), grams | 100 | 100 | 100 | 100 | 100 | 100 |
| Polyalkyl Hydrogen Siloxane (1,200 Mn), grams | 6.8 | 22.2 | 33.3 | 44.6 | 66.4 | 26.6 |
| Trivinylcyclohexane, grams | 0 | 5 | 5 | 5 | 5 | 5 |
| Platinum Catalyst[1], microliters | 8.0 | 26.1 | 26.1 | 26.1 | 26.1 | 78.2 |
| Parts per million of Platinum per Alkenyl Group (mppm) | 20 | 20 | 20 | 20 | 20 | 60 |
| Molar Ratio of Si—H to Alkenyl | 1.2:1 | 1.0:1 | 1.5:1 | 2.0:1 | 3.0:1 | 1.2:1 |
| Notes: | Gelled Fast | | | | | |
| Pot Life (Minutes) | 8 | >60 | >60 | >60 | >60 | >60 |

[1]0.1M Platinum (0)-1,3-Divinyl-1,1,3,3-tetramethyldisiloxane complex in xylene The use of inhibitors can help reduce the change in viscosity as a function of time. However, unlike trivinylcyclohexane, inhibitors have the potential to diffuse or be extracted out of the composition during operation.

The unexpected stabilizing affects of trivinylcyclohexane allow the use of higher concentrations of platinum catalyst; the ability to manufacture compositions without gelling; and the ability to improve stability using moieties that cross-link into the polymer network thereby reducing the diffusion or extraction of the species in the final application. Trivinylcyclohexane can also be used along with inhibitors that do not cross-link into the final network at low levels.

EXAMPLE 3

Physical Property Data (Compression Set, Hardness & Mechanical Properties) for Curable Alkenyl Functional Polyisobutylene Compositions Curable compositions 17 through 22 were prepared using a constant ratio of trivinylcyclohexane to alkenyl terminated polyisobutylene (PIB) while varying the amount of Si—H to the total number of alkenyl groups by varying the polyalkyl hydrogen siloxane content to measure the change in physical, mechanical and thermodynamic properties. Table 6 summarizes these compositions.

TABLE 6

| Description | Inv. Comp. 17 | Inv. Comp. 18 | Inv. Comp. 19 | Inv. Comp. 20 | Inv. Comp. 21 | Inv. Comp. 22 |
|---|---|---|---|---|---|---|
| Alkenyl Terminated Polyisobutylene (5,000 Mn), grams | 100 | 100 | 100 | 100 | 100 | 100 |
| Polyalkyl Hydrogen Siloxane (1,200 Mn), grams | 23.8 | 26.1 | 28.5 | 30.9 | 33.3 | 35.6 |
| Trivinylcyclohexane, grams | 5.0 | 5.0 | 5.0 | 5.0 | 5.0 | 5.0 |
| Platinum Catalyst[1], microliters | 83.9 | 83.9 | 83.9 | 83.9 | 83.9 | 83.9 |
| Parts per million of Platinum per Alkenyl Group (mppm) | 60 | 60 | 60 | 60 | 60 | 60 |
| Molar Ratio of Si—H to Alkenyl | 1.0:1 | 1.1:1 | 1.2:1 | 1.3:1 | 1.4:1 | 1.5:1 |

Figure 4:
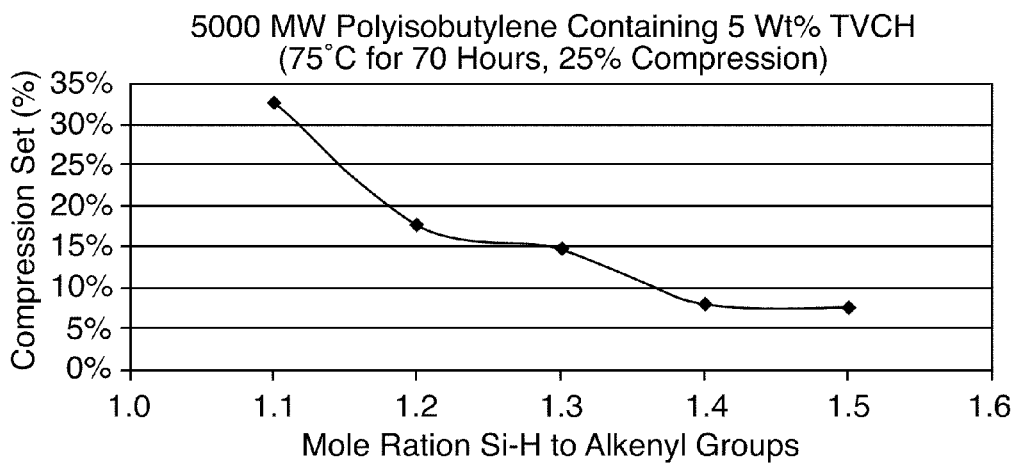
FIG. 4 is a graph of compression set versus the ratio of Si—H to Alkenyl groups for an alkenyl functional polyisobutylene composition.
Figure 5:
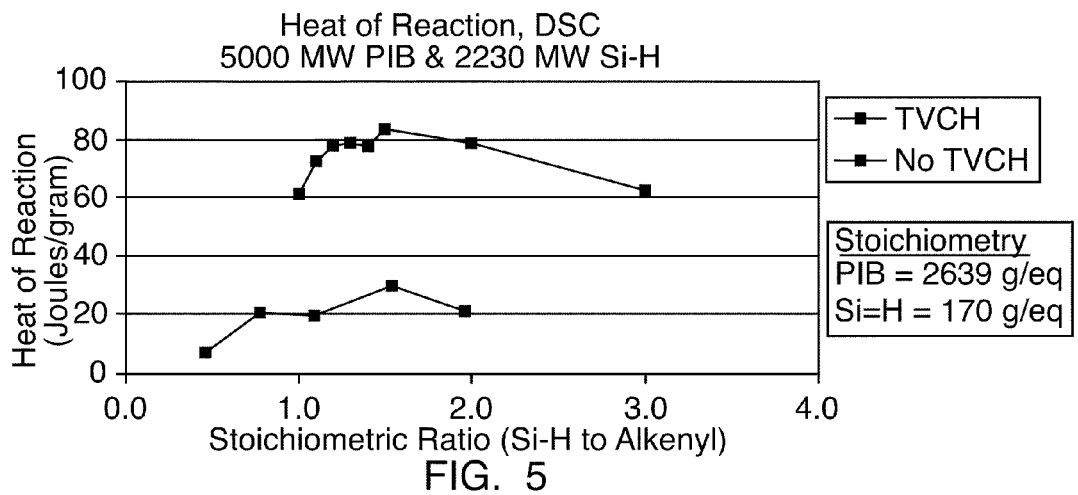
FIG. 5 is a graph of heat of reaction versus the ratio of Si—H to Alkenyl groups for an alkenyl functional polyisobutylene composition comprising trivinylcyclohexane (TUCH) and an alkenyl functional polyisobutylene composition without trivinylcyclohexane.

[1]0.1M Platinum (0)-1,3-Divinyl-1,1,3,3-tetramethyldisiloxane complex in xylene It was observed as shown in Table 7, Table 8 and FIG. 4 that as the stoichiometric imbalance increased (ratio of Si—H to alkenyl groups increased) compression set values decreased and mechanical properties increased. Desirable physical properties for these compositions were obtained at a stoichiometric imbalance of approximately 1.4 to 1.0 (Si—H to alkenyl groups). Table 8 illustrates that compositions having a stoichiometric imbalance of approximately 1.5 to 1.0 (Si—H to alkenyl groups) or greater have a loss of properties such as tensile strength, modulus and elongation. Thus, compositions having a stoichiometric imbalance of approximately 1.5 to 1.0 (Si—H to alkenyl groups) or greater when used as gasketing compositions can undesirably have less sealing force than similar compositions having compositions having a stoichiometric imbalance of approximately 1.4 to 1.0 (Si—H to alkenyl groups) or less.

Comparative composition I was prepared with the alkenyl terminated polyisobutylene (PIB) and polyalkyl hydrogen siloxane at a molar ratio of 1.5:1 of Si—H to the total number of alkenyl groups. Comparative composition I did not contain any trivinylcyclohexane. An inhibitor, i.e., 3,5-dimethyl-1-hexyne-ol, was added to comparative composition I to inhibit the cure rate of the composition so that the compression test could be performed. Without any inhibitor, the composition gelled within a very short time, i.e., a couple of minutes. Comparative Composition I had a compression set of 22 percent.

Compression Set for 5000 Mn Alkenyl Polyisobutylene Composition Comprising 5 Wt % Trivinylcyclohexane and 2230 Mn Polyalkyl Hydrogen Siloxane.

TABLE 7

| Description | Si—H to Alkenyl Molar Ratio | Compression Set at 75° C. for 70 Hours |
|---|---|---|
| Inv. Composition 17 | 1.0:1 | n/a |
| Inv. Composition 18 | 1.1:1 | 32.6 |
| Inv. Composition 19 | 1.2:1 | 17.7 |
| Inv. Composition 20 | 1.3:1 | 14.7 |
| Inv. Composition 21 | 1.4:1 | 7.9 |
| Inv. Composition 22 | 1.5:1 | 7.8 |
| Comparative Composition I | 1.5:1 | 22.2 |

The Si—H to alkenyl molar ratio for curable composition 22 and comparative composition I were the same at 1.5:1. Despite this similarity composition 22 had unexpectedly improved compression set properties as compared to composition I.

Mechanical Properties for a 5000 Mn Alkenyl Polyisobutylene Composition Comprising 5 Wt % Trivinylcyclohexane and 2230 Mn Polyalkyl Hydrogen Siloxane as a Function of Si—H to Alkenyl Ratio.

TABLE 8

| Description | Inv. Comp. 17 | Inv. Comp. 18 | Inv. Comp. 19 | Inv. Comp. 20 | Inv. Comp. 21 | Inv. Comp. 22 |
|---|---|---|---|---|---|---|
| Si—H To Alkenyl Molar Ratio | 1.0:1 | 1.1:1 | 1.2:1 | 1.3:1 | 1.4:1 | 1.5:1 |
| Reaction Properties: | | | | | | |
| Exotherm Onset (° C.) | 59 | 54 | 55 | 53 | 50 | 70 |
| Exotherm Peak (° C.) | 88 | 87 | 87 | 85 | 96 | 92 |
| Heat of Reaction (Joules per gram) | 62 | 72 | 77 | 78 | 77 | 83 |
| Physical Properties: | | | | | | |
| Cure Temp. (° C.) | 110 | 110 | 110 | 110 | 110 | 110 |
| Cure Time. (Min.) | 60 | 60 | 60 | 60 | 60 | 60 |
| Tensile Strength (psi) | 68 | 67 | 138 | 160 | 166 | 140 |
| 50% Modulus (psi) | 15 | 28 | 50 | 62 | 96 | 88 |
| Elongation at Break (%) | 108 | 89 | 101 | 95 | 83 | 76 |
| Shore "A" Hardness | 12 | 17 | 36 | 41 | 45 | 45 |

The increase in tensile strength, modulus, hardness and corresponding decrease in elongation at break was consistent with the increase in the cross-link density as the ratio of Si—H to alkenyl groups increased.

It is generally expected in the art that gross stoichiometric imbalances lead to low molecular weight species that are unusable as high performance polymers. At a stoichiometric imbalance (to alkenyl groups) of r=0.67 (1.0:1.5) one would expect to obtain low molecular weight species. However, the disclosed compositions unexpectedly comprised cross-linked networks and had unexpectedly improved physical, mechanical and compression set properties.

Figure 6:
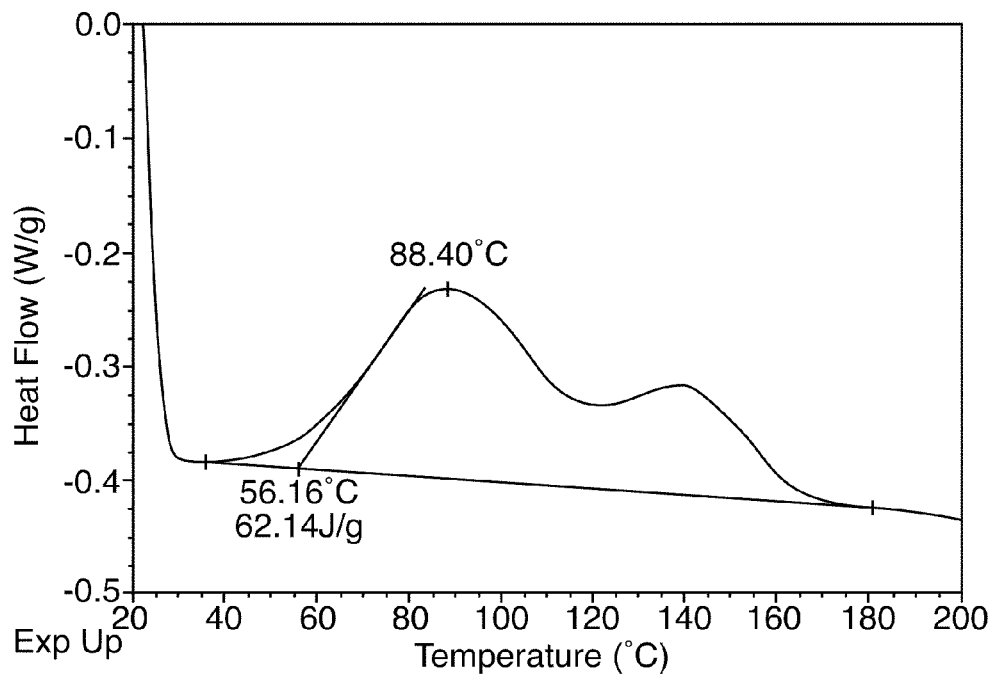
FIG. 6 is a DSC test graph for a polyisobutylene composition having a 1:1 Si—H to alkenyl stoichiometric ratio—Bimodal DSC with high 180° C. upper temperature.
Figure 7:
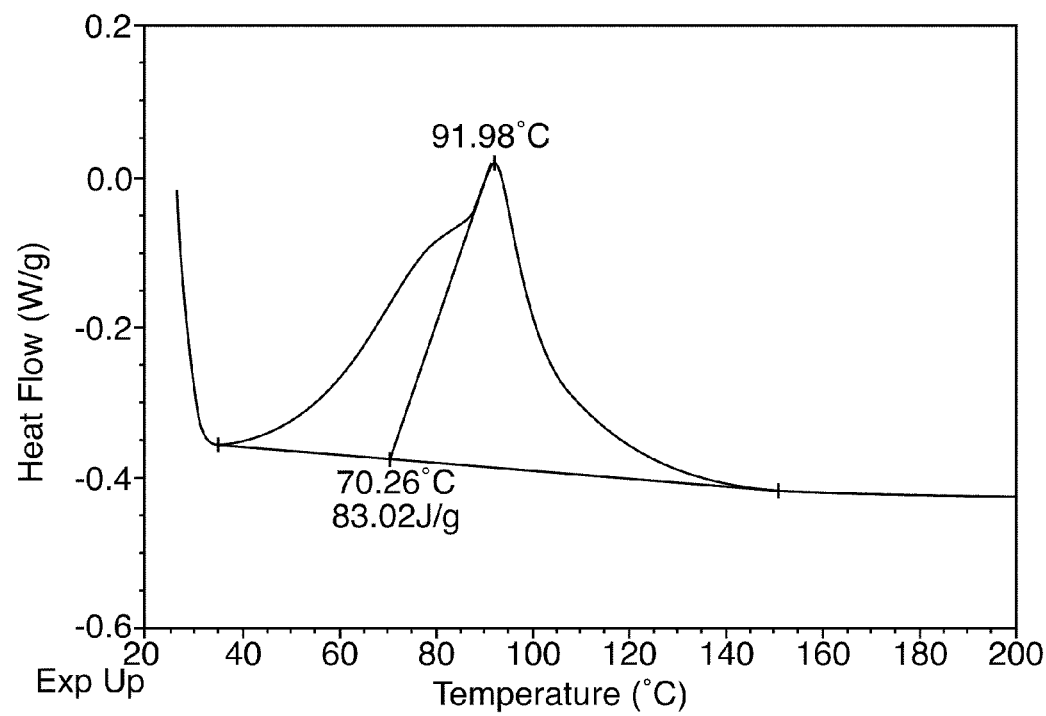
FIG. 7 is a DSC test graph for a polyisobutylene composition having a 1.5 to 1 Si—H to alkenyl stoichiometric ratio imbalance, asymmetric curve with an upper temperature limit below 150° C.
Figure 8:
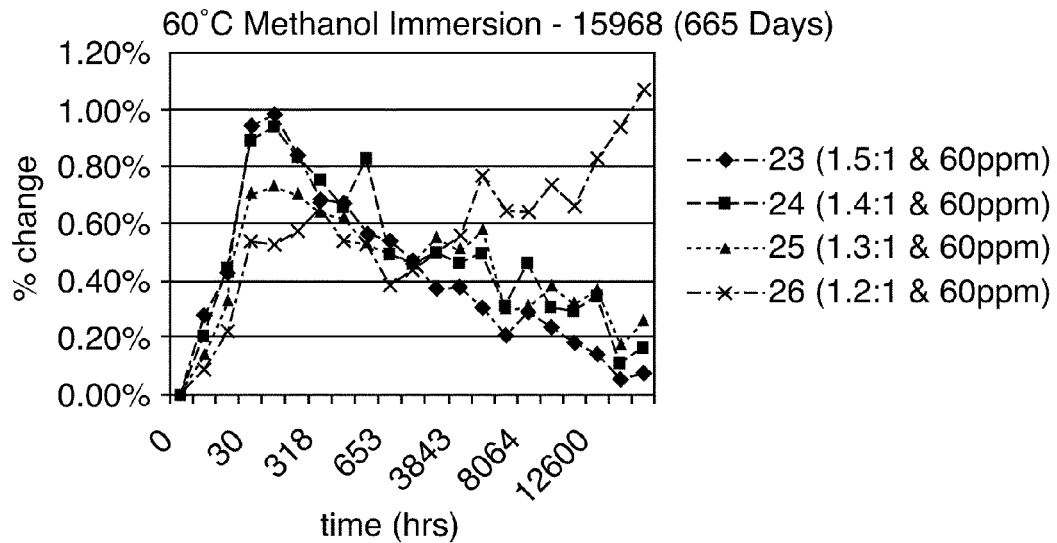
FIG. 8 is a graph of weight gain of four alkenyl functional polyisobutylene compositions versus immersion time in boiling methanol.
Figure 9:
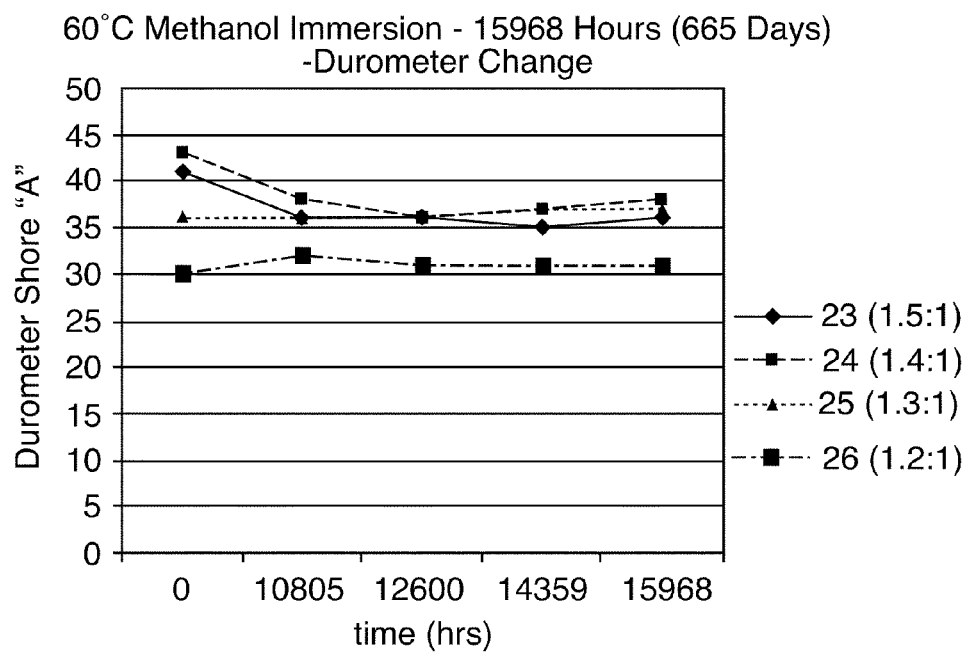
FIG. 9 is a graph of Shore A durometer hardness of four alkenyl functional polyisobutylene compositions versus immersion time in boiling methanol.

It was observed that desirable mechanical properties occur near the maximum value for the heat of reaction as shown in Table 8. It was also observed in FIG. 6 that for composition 17 having a stoichiometric ratio of 1.0:1, the enthalpy from the heat of reaction plotted as a function of temperature was bimodal with an upper temperature limit of 180° C. Disclosed compositions based on a stoichiometric imbalance had a single asymmetric curve with an upper temperature limit of approximately 140° C. as shown in FIG. 7. In the stoichiometric imbalanced compositions the majority of the reaction was completed under 120° C. The lower temperature limit and reaction of the stoichiometric imbalanced compositions are desirable for liquid injection molding operations.

Alkenyl polyisobutylene compositions with a 1.0:1 and 1.5:1 stoichiometric ratio were compared. The comparison showed that the Si—H bond was clearly present in both compositions. The comparison confirms that an excess concentration of Si—H is present in both cured compositions. This excess hydride is desirable as it is possible to improve the adhesion of the cured composition to a substrate through covalent and/or secondary bonding forces via the Si—H moiety.

EXAMPLE 4

Resistance of Curable, Alkenyl Functional Polyisobutylene Compositions to Boiling Alcohol Four curable, alkenyl functional polyisobutylene compositions were prepared. The compositions are illustrated in Table 9. All percents are by weight.

TABLE 9

|  | 23 | 24 | 25 | 26 |
|---|---|---|---|---|
| inv. composition |  |  |  |  |
| Stoichiometric Ratio SiH:Allyl Description | 1.5:1 | 1.4:1 | 1.3:1 | 1.2:1 |
| 5,000 Mn PIB[1] | 72.3% | 73.5% | 74.7% | 76.0% |
| Trivinylcyclohexane[2] | 3.6% | 3.7% | 3.7% | 3.8% |
| Crosslinker (170 g/eq SiH)[3] | 24.0% | 22.8% | 21.5% | 20.2% |
| PT(0) DVTMDS[4] | 0.05% | 0.05% | 0.05% | 0.05% |
| PT(0) DVTMDS (ppm) | 60 | 60 | 60 | 60 |

[1] a 5,000 Mn polyisobutylene diallyl oligomer
[2] a reactive diluent, 162.3 g/mol
[3] a crosslinker comprising silicon hydride (approximately 170 g/eq SiH)
[4] a catalyst available commercially from Aldrich, 381.5 g/mol Samples made from compositions 23 through 26 were immersed in boiling reagent grade methanol at approximately 60° C. As shown in Table 10, compositions 23 through 26, and especially compositions 25 and 26, had a minimal change in Shore A hardness after immersion in boiling methanol

TABLE 10

| | composition | | | |
|---|---|---|---|---|
| | 23 | 24 | 25 | 26 |
| | Stoichiometric Ratio (SiH:Allyl) | | | |
| Time (Hours) | (1.5:1) | (1.4:1) | (1.3:1) | (1.2:1) |
| 0 | 41 | 43 | 36 | 30 |
| 10805 | 36 | 38 | 36 | 32 |
| 12600 | 36 | 36 | 36 | 31 |
| 14359 | 35 | 37 | 37 | 31 |
| 15968 | 36 | 38 | 37 | 31 |

Samples Were Plied to the Required Test Thickness of ¼" to measure hardness

As shown in Tables 11 through 14, curable compositions 23 through 25 demonstrated very little (between 0.1 and 1.0 percent) weight gain after 15,968 hours in boiling methanol (ET=exposure time).

TABLE 11

| | curable composition 23 | | | | | | |
|---|---|---|---|---|---|---|---|
| | Replicant 1 | | Replicant 2 | | Replicant 3 | | |
| ET (Hours) | Weight | % Wt. Chg. | Weight | % Wt. Chg. | Weight | % Wt. Chg. | Average Wt. Chg. |
| 0 | 0.5754 g | 0.000% | 0.4755 g | 0.000% | 0.4436 g | 0.000% | 0.000% |
| 1 | 0.5768 g | 0.243% | 0.4772 g | 0.358% | 0.4446 g | 0.225% | 0.275% |
| 4 | 0.5775 g | 0.365% | 0.4778 g | 0.484% | 0.4455 g | 0.428% | 0.426% |
| 30 | 0.5806 g | 0.904% | 0.4801 g | 0.967% | 0.4479 g | 0.969% | 0.947% |
| 54 | 0.5809 g | 0.956% | 0.4803 g | 1.009% | 0.4480 g | 0.992% | 0.986% |
| 174 | 0.5801 g | 0.817% | 0.4798 g | 0.904% | 0.4472 g | 0.812% | 0.844% |
| 318 | 0.5791 g | 0.643% | 0.4789 g | 0.715% | 0.4467 g | 0.699% | 0.686% |
| 366 | 0.5789 g | 0.608% | 0.4790 g | 0.736% | 0.4466 g | 0.676% | 0.674% |
| 503 | 0.5783 g | 0.504% | 0.4786 g | 0.652% | 0.4460 g | 0.541% | 0.566% |
| 653 | 0.5779 g | 0.434% | 0.4783 g | 0.589% | 0.4462 g | 0.586% | 0.536% |
| 1159 | 0.5783 g | 0.504% | 0.4778 g | 0.484% | 0.4455 g | 0.428% | 0.472% |
| 2903 | 0.5774 g | 0.348% | 0.4773 g | 0.379% | 0.4453 g | 0.383% | 0.370% |
| 3843 | 0.5770 g | 0.278% | 0.4772 g | 0.358% | 0.4458 g | 0.496% | 0.377% |
| 5691 | 0.5764 g | 0.174% | 0.4770 g | 0.315% | 0.4455 g | 0.428% | 0.306% |
| 7254 | 0.5767 g | 0.226% | 0.4764 g | 0.189% | 0.4445 g | 0.203% | 0.206% |
| 8064 | 0.5764 g | 0.174% | 0.4768 g | 0.273% | 0.4454 g | 0.406% | 0.284% |
| 8811 | 0.5763 g | 0.156% | 0.4763 g | 0.168% | 0.4453 g | 0.383% | 0.236% |
| 10805 | 0.5761 g | 0.122% | 0.4764 g | 0.189% | 0.4446 g | 0.225% | 0.179% |

TABLE 11-continued

| | curable composition 23 | | | | | | |
|---|---|---|---|---|---|---|---|
| | Replicant 1 | | Replicant 2 | | Replicant 3 | | |
| ET (Hours) | Weight | % Wt. Chg. | Weight | % Wt. Chg. | Weight | % Wt. Chg. | Average Wt. Chg. |
| 12600 | 0.5759 g | 0.087% | 0.4760 g | 0.105% | 0.4446 g | 0.225% | 0.139% |
| 14359 | 0.5757 g | 0.052% | 0.4755 g | 0.000% | 0.4441 g | 0.113% | 0.055% |
| 15968 | 0.5760 g | 0.104% | 0.4755 g | 0.000% | 0.4441 g | 0.113% | 0.072% |

TABLE 12

| | curable composition 24 | | | | | | |
|---|---|---|---|---|---|---|---|
| | Replicant 1 | | Replicant 2 | | Replicant 3 | | |
| ET (Hours) | Weight | % Wt. Chg. | Weight | % Wt. Chg. | Weight | % Wt. Chg. | Average Wt. Chg. |
| 0 | 0.5956 g | 0.000% | 0.4826 g | 0.000% | 0.4563 g | 0.000% | 0.000% |
| 1 | 0.5966 g | 0.168% | 0.4837 g | 0.228% | 0.4573 g | 0.219% | 0.205% |
| 4 | 0.5980 g | 0.403% | 0.4848 g | 0.456% | 0.4585 g | 0.482% | 0.447% |
| 30 | 0.6007 g | 0.856% | 0.4869 g | 0.891% | 0.4605 g | 0.920% | 0.889% |
| 54 | 0.6009 g | 0.890% | 0.4872 g | 0.953% | 0.4607 g | 0.964% | 0.936% |
| 174 | 0.6003 g | 0.789% | 0.4867 g | 0.850% | 0.4602 g | 0.855% | 0.831% |
| 318 | 0.5995 g | 0.655% | 0.4861 g | 0.725% | 0.4602 g | 0.855% | 0.745% |
| 366 | 0.5994 g | 0.638% | 0.4857 g | 0.642% | 0.4594 g | 0.679% | 0.653% |
| 503 | 0.6003 g | 0.789% | 0.4868 g | 0.870% | 0.4600 g | 0.811% | 0.823% |
| 653 | 0.5985 g | 0.487% | 0.4850 g | 0.497% | 0.4585 g | 0.482% | 0.489% |
| 1159 | 0.5982 g | 0.437% | 0.4849 g | 0.477% | 0.4584 g | 0.460% | 0.458% |
| 2903 | 0.5984 g | 0.470% | 0.4852 g | 0.539% | 0.4584 g | 0.460% | 0.490% |
| 3843 | 0.5988 g | 0.537% | 0.4846 g | 0.414% | 0.4582 g | 0.416% | 0.456% |
| 5691 | 0.5987 g | 0.520% | 0.4850 g | 0.497% | 0.4584 g | 0.460% | 0.493% |
| 7254 | 0.5980 g | 0.403% | 0.4842 g | 0.332% | 0.4572 g | 0.197% | 0.311% |
| 8064 | 0.5987 g | 0.520% | 0.4847 g | 0.435% | 0.4582 g | 0.416% | 0.457% |
| 8811 | 0.5978 g | 0.369% | 0.4839 g | 0.269% | 0.4575 g | 0.263% | 0.301% |
| 10805 | 0.5975 g | 0.319% | 0.4840 g | 0.290% | 0.4575 g | 0.263% | 0.291% |
| 12600 | 0.5976 g | 0.336% | 0.4840 g | 0.290% | 0.4582 g | 0.416% | 0.347% |
| 14359 | 0.5957 g | 0.017% | 0.4833 g | 0.145% | 0.4570 g | 0.153% | 0.105% |
| 15968 | 0.5973 g | 0.285% | 0.4833 g | 0.145% | 0.4566 g | 0.066% | 0.165% |

TABLE 13

| | curable composition 25 | | | | | | |
|---|---|---|---|---|---|---|---|
| | Replicant 1 | | Replicant 2 | | Replicant 3 | | |
| ET (Hours) | Weight | % Wt. Chg. | Weight | % Wt. Chg. | Weight | % Wt. Chg. | Average Wt. Chg. |
| 0 | 0.5894 g | 0.000% | 0.4582 g | 0.000% | 0.3919 g | 0.000% | 0.000% |
| 1 | 0.5900 g | 0.102% | 0.4589 g | 0.153% | 0.3926 g | 0.179% | 0.144% |
| 4 | 0.5912 g | 0.305% | 0.4596 g | 0.306% | 0.3934 g | 0.383% | 0.331% |
| 30 | 0.5933 g | 0.662% | 0.4615 g | 0.720% | 0.3948 g | 0.740% | 0.707% |
| 54 | 0.5937 g | 0.730% | 0.4616 g | 0.742% | 0.3948 g | 0.740% | 0.737% |
| 174 | 0.5935 g | 0.696% | 0.4614 g | 0.698% | 0.3948 g | 0.740% | 0.711% |
| 318 | 0.5937 g | 0.730% | 0.4612 g | 0.655% | 0.3941 g | 0.561% | 0.649% |
| 366 | Disc | Disc | 0.4609 g | 0.589% | 0.3945 g | 0.663% | 0.626% |
| 503 | Disc | Disc | 0.4605 g | 0.502% | 0.3941 g | 0.561% | 0.532% |
| 653 | Disc | Disc | 0.4604 g | 0.480% | 0.3939 g | 0.510% | 0.495% |
| 1159 | Disc | Disc | 0.4600 g | 0.393% | 0.3940 g | 0.536% | 0.464% |
| 2903 | Disc | Disc | 0.4607 g | 0.546% | 0.3941 g | 0.561% | 0.553% |
| 3843 | Disc | Disc | 0.4600 g | 0.393% | 0.3944 g | 0.638% | 0.515% |
| 5691 | Disc | Disc | 0.4606 g | 0.524% | 0.3944 g | 0.638% | 0.581% |
| 7254 | Disc | Disc | 0.4590 g | 0.175% | 0.3936 g | 0.434% | 0.304% |
| 8064 | Disc | Disc | 0.4595 g | 0.284% | 0.3932 g | 0.332% | 0.308% |
| 8811 | Disc | Disc | 0.4595 g | 0.284% | 0.3938 g | 0.485% | 0.384% |
| 10805 | Disc | Disc | 0.4593 g | 0.240% | 0.3935 g | 0.408% | 0.324% |
| 12600 | Disc | Disc | 0.4596 g | 0.306% | 0.3936 g | 0.434% | 0.370% |
| 14359 | Disc | Disc | 0.4589 g | 0.153% | 0.3927 g | 0.204% | 0.178% |
| 15968 | Disc | Disc | 0.4591 g | 0.196% | 0.3932 g | 0.332% | 0.264% |

Disc = testing discontinued

TABLE 14

| | curable composition 26 | | | | | | |
|---|---|---|---|---|---|---|---|
| | Replicant 1 | | Replicant 2 | | Replicant 3 | | |
| ET (Hours) | Weight | % Wt. Chg. | Weight | % Wt. Chg. | Weight | % Wt. Chg. | Average Wt. Chg. |
| 0 | 0.4899 g | 0.000% | 0.4338 g | 0.000% | 0.3797 g | 0.000% | 0.000% |
| 1 | 0.4906 g | 0.143% | 0.4342 g | 0.092% | 0.3798 g | 0.026% | 0.087% |
| 4 | 0.4913 g | 0.286% | 0.4348 g | 0.231% | 0.3803 g | 0.158% | 0.225% |
| 30 | 0.4929 g | 0.612% | 0.4361 g | 0.530% | 0.3815 g | 0.474% | 0.539% |
| 54 | 0.4930 g | 0.633% | 0.4361 g | 0.530% | 0.3813 g | 0.421% | 0.528% |
| 174 | 0.4930 g | 0.633% | 0.4363 g | 0.576% | 0.3816 g | 0.500% | 0.570% |
| 318 | 0.4935 g | 0.735% | 0.4367 g | 0.669% | 0.3818 g | 0.553% | 0.652% |
| 366 | 0.4929 g | 0.612% | 0.4360 g | 0.507% | 0.3816 g | 0.500% | 0.540% |
| 503 | 0.4936 g | 0.755% | 0.4358 g | 0.461% | 0.3811 g | 0.369% | 0.528% |
| 653 | 0.4920 g | 0.429% | 0.4356 g | 0.415% | 0.3809 g | 0.316% | 0.387% |
| 1159 | 0.4920 g | 0.429% | 0.4362 g | 0.553% | 0.3810 g | 0.342% | 0.441% |
| 2903 | 0.4927 g | 0.572% | 0.4363 g | 0.576% | 0.3810 g | 0.342% | 0.497% |
| 3843 | 0.4929 g | 0.612% | 0.4365 g | 0.622% | 0.3814 g | 0.448% | 0.561% |
| 5691 | 0.4943 g | 0.898% | 0.4375 g | 0.853% | 0.3818 g | 0.553% | 0.768% |
| 7254 | 0.4938 g | 0.796% | 0.4367 g | 0.669% | 0.3815 g | 0.474% | 0.646% |
| 8064 | 0.4936 g | 0.755% | 0.4367 g | 0.669% | 0.3816 g | 0.500% | 0.641% |
| 8811 | 0.4939 g | 0.816% | 0.4371 g | 0.761% | 0.3821 g | 0.632% | 0.736% |
| 10805 | 0.4933 g | 0.694% | 0.4365 g | 0.622% | 0.3822 g | 0.658% | 0.658% |
| 12600 | 0.4947 g | 0.980% | 0.4374 g | 0.830% | 0.3823 g | 0.685% | 0.831% |
| 14359 | 0.4948 g | 1.000% | 0.4382 g | 1.014% | 0.3827 g | 0.790% | 0.935% |
| 15968 | 0.4963 g | 1.306% | 0.4384 g | 1.060% | 0.3829 g | 0.843% | 1.070% |

These results illustrate that a curable composition comprising an alkenyl functional, polyisobutylene composition will retain its mechanical properties after exposure to hydrocarbons such as alcohols.

EXAMPLE 5

Curable Composition Resistance to Ethanol Vapor Permeation

A polyisobutylene curable composition sample and a comparative room temperature vulcanizing silicone sealant sample were prepared as described below.

Polyisobutylene Based Curable Composition 27

| | |
|---|---|
| α,ω-diolefin polyisobutylene, 5,000 Mn | 56 |
| Ground CaCO3 | 37 |
| fumed silica | 1 |
| Silane cross-linking components | 5.7 |
| 3-methyl-1-butyne-3-ol | 0.1 |
| Pt-divinyl tetramethyl disiloxane 3% in Xylene | 0.2 |
| total | 100.0 |

Silicone Based Comparative Composition J

Loctite 5999 (available from Henkel Corporation, Connecticut) was used. Loctite 5999 is a silicone based sealant useful in form in place gasket (FIPG) applications.

Preparation of Sample Sheet

Composition 27 was pressed between Teflon plates separated by a 1 mm spacer at a temperature of 120° C. for 1 h to form a 1 mm thick sheet. After cooling to room temperature sample sheet 27 was removed.

Composition J was pressed between Teflon plates separated by a 1 mm spacer to form a 1 mm thick sheet. Sample composition J was cured in place by exposure to 23° C. and 50% RH for 168 h. Sample sheet J was removed after curing.

Cured sample sheets 27 and J were checked to choose a test area having an even thickness and free from pinholes. A test sample 30 mm in diameter was cut from test areas of each of sample sheets 27 and J.

Vapor Permeation Test

Two glass test tubes (inner diameter 20 mm×tube length 100 mm) were filled with 4.00 g of ethanol. Immediately after filling one test tube is covered with test sample 27 and the other test tube is covered with test sample J. The edge of each test sample was attached and the edge covered with a metal binder in order to prevent ethanol vapor leakage through the boundary between tube edge and attached test sample. Each covered tube was stored at 23° C. and 50% RH. The weight of each test tube was measured at timed intervals. The ethanol vapor loss results are shown in Table 15.

TABLE 15

| | Polyisobutylene sample 27 | | Silicone sample J | |
|---|---|---|---|---|
| time | (gm) | (%) | (gm) | (%) |
| initial | 0.00 | 0.00 | 0.00 | 0.00 |
| 24 h | 0.00 | 0.00 | 0.10 | 0.25 |
| 48 h | 0.00 | 0.00 | 0.22 | 5.00 |
| 72 h | 0.00 | 0.00 | 0.31 | 7.75 |
| 336 h | 0.00 | 0.00 | 1.59 | 39.75 |

The polyisobutylene curable composition forming sample 27 provides a much lower permeability to ethanol vapor as compared to comparative silicone material J. Even after 336 hours no ethanol vapor permeated through the polyisobutylene composition of sample 27 while 1.59 grams of ethanol had been lost from through comparative silicone material of sample J.

EXAMPLE 6

Polyisobutylene Composition Resistance to Degradation after Immersion in Ethanol Polyisobutylene composition 27 and comparative silicone composition J from Example 5 were used.

Preparation of Test Specimen

Sheets of sample composition 27 and comparative silicone composition J with a thickness of 2 mm were prepared as described above. Each sample sheet was cut into dumbbell shaped specimens as per ISO-527-3. Physical properties of the dumbbell specimens were checked and recorded. The dumbbell specimens were subsequently immersed in ethanol at 23° C. for 24 hr. The properties were rechecked 5 minutes after removal of the specimen from immersion without extra drying (23° C. and 50% RH). The results in Table 16 were calculated as a ratio (value after immersion)/(initial value)× 100.

TABLE 16

| Property | PIB composition sample 27 | comparative silicone sample J |
|---|---|---|
| Hardness Shore A | 100 | 95% |
| Tensile Strength | 100 | 92% |
| Elongation | 101 | 105% |
| 100% Modulus | 100 | 85% |

Polyisobutylene composition 27 showed little change in physical properties after soaking in ethanol. Comparative silicone material J became softer and weaker after soaking in ethanol. The property changes in comparative silicone material J indicate that the silicone material was swelling due to ethanol exposure. Polyisobutylene composition 27 is a superior sealing material for applications where ethanol exposure may occur.

The Examples illustrate the excellent barrier properties and resistance to change of mechanical properties of curable compositions comprising alkenyl functional polyisobutylene when exposed to liquid or vapor hydrocarbons containing alcohols. Curable compositions comprising alkenyl functional polyisobutylene are also expected to have excellent resistance to other low molecular weight alcohols such as propanol.

What is claimed is:

1. A component defining an internal chamber, comprising:
    a first predetermined internal combustion engine sealing surface in fluid communication with the chamber;
    a second predetermined internal combustion engine sealing surface aligned with the first sealing surface and in fluid communication with the chamber; and
    a cured reaction product of a curable composition disposed between the first and second predetermined sealing surfaces and sealing the chamber, the composition comprising:
        an alkenyl functional polyisobutylene oligomer;
        an optional functional alkenyl monomer;
        a silane cross-linking component having at least two silicon hydride functional groups and having structure 1:

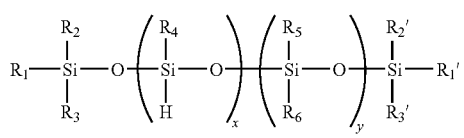

where $R_1$, $R_2$, $R_3$, $R'_1$, $R'_2$, $R'_3$, $R_4$, $R_5$ and $R_6$ are each independently selected from a methyl group; a hydrogen group; a phenyl group; a substituted hydrocarbon containing one to twenty carbon atoms or an unsubstituted hydrocarbon containing one to twenty carbon atoms;
        X is an integer from 1 to 1,000;
        y is an integer from 1 to 1000; and
    a hydrosilylation catalyst.

2. The component of claim 1 wherein the first sealing surface and the second sealing surface are in fixed relationship.

3. The component of claim 1 selected from a vehicle fuel system component or a vehicle cooling system component.

4. The component of claim 1 wherein an internal combustion engine intake manifold comprises one of the first sealing surface or the second sealing surface.

5. The component of claim 1 wherein an internal combustion engine block comprises one of the first sealing surface or the second sealing surface.

6. The component of claim 1 wherein the reaction product is adhesively bonded to only one of the first and second sealing surfaces.

7. The component of claim 1 wherein the reaction product is adhesively bonded to both the first and second sealing surfaces.

8. The component of claim 1 wherein the cured composition has an ethanol vapor permeation test result of 0.0 grams after 240 hours.

9. The component of claim 1, wherein the functional alkenyl monomer is present and selected from 1,9-decadiene, trivinylcyclohexane and combinations thereof.

10. The component of claim 1, wherein the alkenyl functional polyisobutylene oligomer is an alkenyl terminated diallyl polyisobutylene oligomer.

11. The component of claim 1, wherein the composition has a silicon-hydride to alkenyl molar ratio of about 0.5:1 to about 1.5:1.

12. A method of using a curable composition as a liquid gasketing composition, comprising:
    providing a composition comprising:
        an alkenyl functional polyisobutylene oligomer;
        an optional functional alkenyl monomer;
        a silane cross-linking component having at least two silicon hydride functional groups and having structure 1:

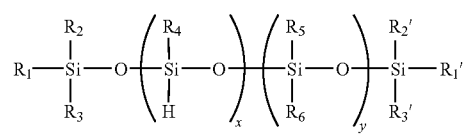

where $R_1$, $R_2$, $R_3$, $R'_1$, $R'_2$, $R'_3$, $R_4$, $R_5$ and $R_6$ are each independently selected from a methyl group; a hydrogen group; a phenyl group; a substituted hydrocarbon containing one to twenty carbon atoms or an unsubstituted hydrocarbon containing one to twenty carbon atoms;
        X is an integer from 1 to 1,000;
        y is an integer from 1 to 1000; and
        a hydrosilylation catalyst;
    dispensing the composition onto a first predetermined internal combustion engine sealing surface,
    aligning the first predetermined sealing surface and dispensed composition with a second predetermined internal combustion engine sealing surface; and
    exposing the dispensed the composition to conditions appropriate to effect cure thereof, wherein cured reaction products of the composition form a seal between the first and second sealing surfaces, the seal having an ethanol vapor permeation test result of 0.0 grams after 240 hours.

13. The method of claim 12 wherein the composition is cured while in contact with the first and second sealing surfaces.

14. A vehicle component, comprising:
a first portion defining a cavity and a first predetermined internal combustion engine sealing surface in fluid communication with the cavity;
a second portion having a second predetermined internal combustion engine sealing surface aligned with the first predetermined sealing surface and in fluid communication with the cavity; and
a cured reaction product of a curable composition disposed between and sealing the first and second predetermined sealing surfaces, the composition comprising:
an alkenyl functional polyisobutylene oligomer;
an optional functional alkenyl monomer;
a silane cross-linking component having at least two silicon hydride functional groups and having structure 1:

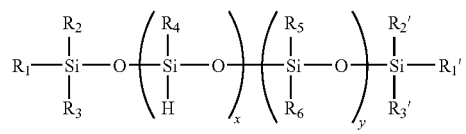

where $R_1$, $R_2$, $R_3$, $R'_1$, $R'_2$, $R'_3$, $R_4$, $R_5$ and $R_6$ are each independently selected from a methyl group; a hydrogen group; a phenyl group; a substituted hydrocarbon containing one to twenty carbon atoms or an unsubstituted hydrocarbon containing one to twenty carbon atoms;
X is an integer from 1 to 1,000;
y is an integer from 1 to 1000; and
a hydrosilylation catalyst;
wherein the seal has an ethanol vapor permeation test result of 0.0 grams after 240 hours.

15. The component of claim 14 wherein the composition comprises a mole ratio of silane cross-linking component: alkenyl groups of 0.9:1 to 3.0:1.

16. The component of claim 14 wherein the vehicle component is a vehicle fuel system component or a vehicle cooling system component.

17. The component of claim 14 wherein one of the first portion or the second portion is a vehicle intake manifold.

18. The component of claim 14 wherein one of the first portion or the second portion is an engine block.

19. The method of claim 14 wherein the cured composition has an ethanol vapor permeation test result of 0.0 grams after 240 hours.

20. The component of claim 1, wherein the cured reaction product is exposed to an alternative fuel selected from at least one of reformulated gasoline, E10 ethanol, E85 ethanol, diesel, biodiesel, natural gas and liquefied petroleum gas (LPG).

* * * * *